United States Patent
Foster (10) Patent No.: US 10,162,828 B2
(45) Date of Patent: Dec. 25, 2018

(54) STRIPING FILES ACROSS NODES OF A DISTRIBUTED FILE SYSTEM

(71) Applicant: Red Hat, Inc., Raleigh, NC (US)

(72) Inventor: Brian Foster, Haverhill, MA (US)

(73) Assignee: Red Hat, Inc., Raleigh, NC (US)

( * ) Notice: Subject to any disclaimer, the term of this patent is extended or adjusted under 35 U.S.C. 154(b) by 684 days.

(21) Appl. No.: 13/679,717

(22) Filed: Nov. 16, 2012

(65) Prior Publication Data

US 2014/0143220 A1    May 22, 2014

(51) Int. Cl.
*G06F 17/30* (2006.01)
(52) U.S. Cl.
CPC .............................. *G06F 17/30091* (2013.01)
(58) Field of Classification Search
CPC ...................... G06F 17/30091; G06F 17/30194
See application file for complete search history.

(56) References Cited

U.S. PATENT DOCUMENTS

2009/0164539 A1* 6/2009 Pudipeddi ........... G06F 17/3007
2012/0131275 A1* 5/2012 Huang et al. ................. 711/114

OTHER PUBLICATIONS

Oracle, Lustre 2.0 Operations Manual, Jul. 2010 [retrieved on Apr. 15, 2015]. Retrieved from the Internet: https://docs.oracle.com/cd/E19527-01/821-2076-10/821-2076-10.pdf.*
Phillip Dickens and Jeremy Logan, "Towards a High Performance Implementation of MPI-IO on the Lustre File System," in On the Move to Meaningful Internet Systems: OTM 2008, Lecture Notes in Computer Science, vol. 5331, 2008 [retrieved on Apr. 15, 2015]. Retrieved from the Internet: http://link.springer.com/chapter/10.1007%2F978-3-540-88871-0_61#.*
University of Deleware, "All About Lustre," Oct. 5, 2012 [retrieved on Feb. 19, 2017]. Retrieved from the Internet: https://docs.hpc.udel.edu/general/filesystems/all-about-lustre.*

* cited by examiner

*Primary Examiner* — Kristopher Andersen
(74) *Attorney, Agent, or Firm* — Lowenstein Sandler LLP (57) ABSTRACT

A processing device executing a client of a distributed file system receives an initial file, wherein the distributed file system comprises a plurality of nodes, each of the plurality of nodes comprising a local file system that interfaces with the distributed file system. The processing device causes the plurality of nodes to generate file entries of the initial file. The processing device divides the initial file into a plurality of portions, each of the plurality of portions having initial offsets within the initial file. The processing device assigns subsets of the plurality of portions to the plurality of nodes, wherein each of the plurality of nodes is assigned a different subset. The processing device causes the plurality of nodes to write the portions of the assigned subsets at modified offsets within the file entries, wherein the modified offsets cause the portions of the assigned subsets to be contiguous.

20 Claims, 6 Drawing Sheets

STRIPING FILES ACROSS NODES OF A DISTRIBUTED FILE SYSTEM

TECHNICAL FIELD

Embodiments of the invention relate generally to a distributed file system, and more specifically to striping files across storage servers of the distributed file system.

BACKGROUND

Traditional disk file systems such as EXT3, EXT4, FAT32, XFS, NTFS, and so forth are installed on discrete data stores. Some network file systems such as GlusterFS® are layered file systems that layer on top of and interconnect multiple different instances of traditional file systems.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and apparatus for striping files across nodes in a distributed file system. The distributed file system may include multiple storage servers, each of which may control one or more storage resources, such as disks and/or memory. Each of the storage servers may use a local file system (e.g., a disk file system) to manage the storage of data on its storage resources. The distributed file system may layer on top of, and interface with, the local file systems. A client of the distributed file system may receive an initial file along with a command to write the initial file to the distributed file system. The distributed file system may then stripe the initial file across the multiple storage servers. A stripe is a concurrent series of data portions of an initial file, where one data portion from the concurrent series is stored on each of the storage servers. To stripe the initial file across the storage servers of the distributed file system, a file entry of the initial file may be created on each of the storage servers. The file system client may divide the file into multiple portions, and distribute the portions between the storage servers. Therefore, a different subset of the portions may be assigned to each of the storage servers. Distributing the portions between the storage servers includes writing the portions to offsets within the file entries on the storage servers. However, before writing the portions to the file entries, offsets of the portions may be modified so that the subsets of the portions are contiguous within the file entries.

Modifying the offsets of the portions before writing them to the file entries, and thus causing the portions within the file entries to be contiguously arranged, causes the file entries to be optimized for processing by the underlying local file systems of the storage servers. Specifically, many traditional local file systems such as XFS perform a technique called preallocation to optimize write operations. A file system that performs preallocation allocates more space than is requested to satisfy a write operation. The extra space is allocated in the anticipation of receiving subsequent write operations. However, if the portions of the initial file are allocated to the different file entries without modifying the offsets of those portions within the file entries, then this preallocated space will never get used. This can result in each of the file entries being roughly the same size as the initial file. If the initial file were striped across four storage servers without modifying the offsets, then a total storage space of four times the initial file size would be consumed. However, by modifying the offsets, the preallocated space allocated by the local file system is used, which reduces the sizes of the file entries to approximately the size of the initial file divided by the number of storage servers. Therefore, the total storage space may be reduced to approximately the size of the initial file.

Similarly, during a read operation, many file systems perform a read ahead, in which the file systems read data ahead of requested offsets. This improves read performance in most circumstances. However, if the non-requested offsets that are read will never be used, then reading ahead to those offsets unnecessarily consumes system resources. By coalescing the portions of the initial file into contiguous offsets, the distributed file system may ensure that the read ahead functionality of local file systems is not counterproductive.

Figure 1:
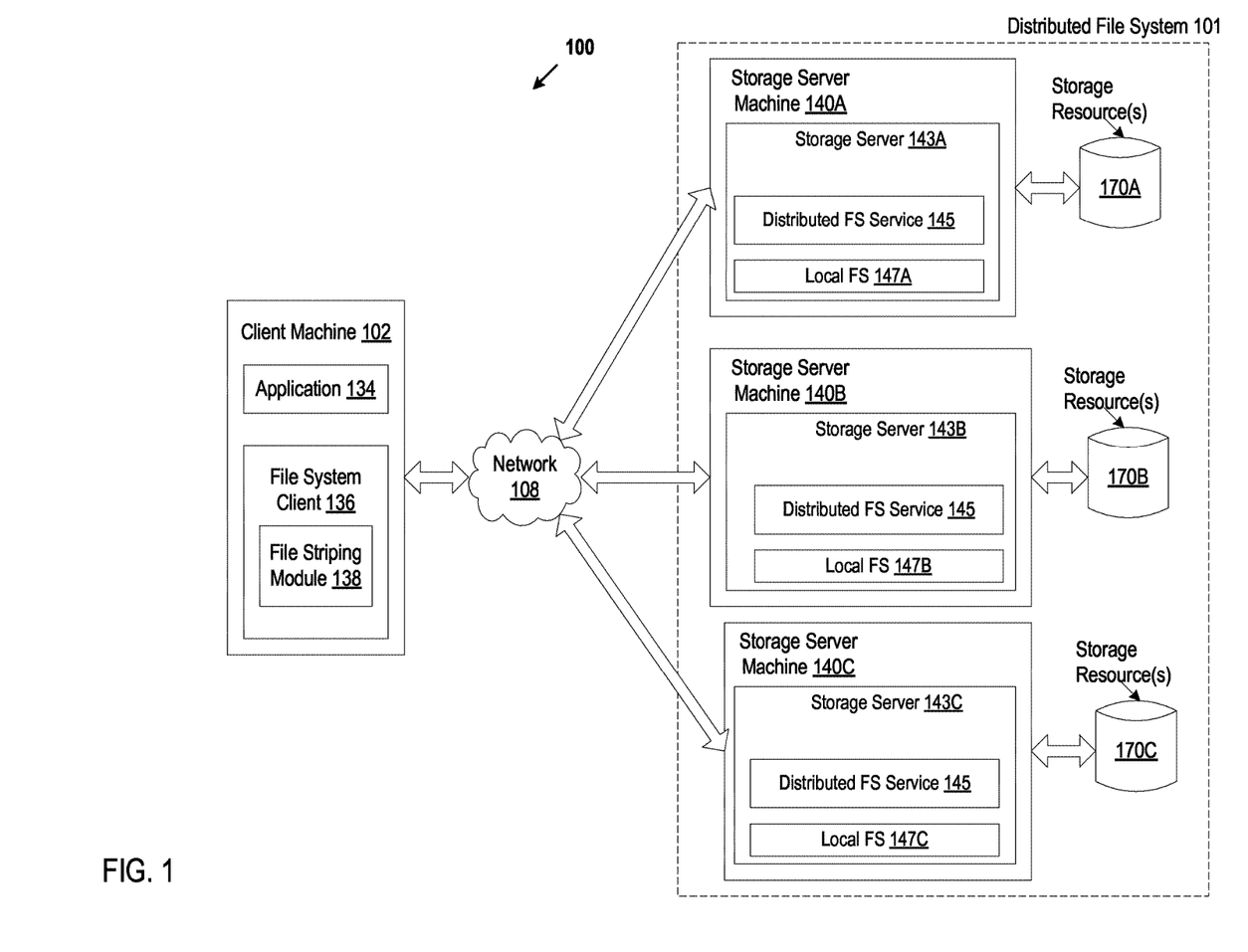
FIG. 1 illustrates an example system architecture having a distributed file system, in accordance with various implementations.

FIG. 1 is an example system architecture 100 for various implementations. The system architecture 100 can include a distributed file system 101 coupled to one or more client machines 102 via a network 108. The network 108 may be a public network (e.g., the Internet), a private network (e.g., a local area network (LAN) or wide area network (WAN)), or a combination thereof. Network 108 can include a wireless infrastructure, which may be provided by one or multiple wireless communications systems, such as a wireless fidelity (WiFi) hotspot connected with the network 108 and/or a wireless carrier system that can be implemented using various data processing equipment, communication towers, etc.

The distributed file system 101 can be a network attached storage file system that includes one or more storage server machines 140A-C, each of which may control any number of storage resources 170A-C. A storage server machine 140A-C can include a network-accessible server-based functionality (e.g., storage server 143A-C). The storage server machines 140A-C can include, and are not limited to, any data processing device, such as a desktop computer, a laptop computer, a mainframe computer, a personal digital assistant, a rackmount server, a handheld device or any other device configured to process data. The storage server machines 140A-C of the distributed file system 101 may be grouped into one or more clusters. A cluster is a group of linked storage servers 143A-C working together closely.

The storage resources 170A-C may be mass storage devices, such as magnetic or optical storage based disks, solid-state drives (SSDs) or hard drives, coupled to the storage server machines 140A-B (either directly or via the network 108). The storage resources 170A-C may also include memory such as random access memory (RAM), Flash memory, and so forth. For convenience, some embodiments provided herein may be described with reference to disks or other mass storage devices. However, it should be understood that such embodiments may also apply to memory storage resources.

Storage servers 143A-C each host a local file system that manages the storage of data on storage resources 170A-C. Each of the storage resources 170A-C may be formatted in accordance with a particular local file system (FS) 147A-C. The local FS 147A-C may create directories, partitions, logical volumes, and so forth on the storage resources 170A-C as well as store data (e.g., files) thereon. Examples of local disk file systems that may be used on disk storage resources include EXT3, EXT4, XFS, NTFS, FAT16, FAT32, and so forth. Various flash file systems, tape file systems, optical disc file systems, memory files systems and so on may alternatively be used for other non-disk storage resources (e.g., for memory storage resources).

Storage servers 143A-C each additionally include an instance of a distributed file system (FS) service 145. The distributed FS service 145 interfaces with local file systems 147A-C to create directories on the storage resources 170A-C, store data on the storage resources 170A-C, read data from the storage resources 170A-C, and perform other standard file operations. The distributed file system service 145 instances additionally interface with one another and/or a file system client 136 to form the distributed file system 101, where each store server 143A-C acts as a node of the distributed file system 101.

The distributed file system services 145, and thus the distributed file system 101, can store data as files and can include directories, also referred to as folders, which are virtual containers within the file system 101. Groups of computer files and possibly other sub-directories can be kept and organized within the directories. A sub-directory, also referred to as a sub-folder, is a directory contained inside another directory. The top-most directory is referred to as a root or top-level directory within the file system 101. Together, the directories form a hierarchy, or tree structure, of one or more levels in the file system 101.

The distributed file system 101 can organize data (e.g., source files) in the disks 170A-C using sub-volumes. A volume may be an instance of the distributed file system 101. A volume can include sub-volumes, which can be resident on one or more partitions or directories of hardware resources 170A-C (e.g., of a hard disk). A sub-volume can be a representation of one or more logical locations, rather than physical locations, of storage areas in the file system 101. For example, a physical hard disk-1 may have two partitions, partition-1 and partition-2. A sub-volume label "C:" may be assigned to partition-1 and a sub-volume label "D:" may be assigned to partition-2. Hard disk-1 is a physical disk and "C:" and "D:" are sub-volumes representing logical locations on physical hard disk-1. Each of the sub-volumes may be a logical and/or physical location. A single volume may be mounted by client machine 102 to gain access to the entire distributed file system spread over multiple sub-volumes.

A mounted directory or sub-volume, also referred to as a brick, can be a basic unit of storage, represented by an export directory on a storage server 143A-C. A brick can be assigned to a volume. When a brick is processed, for example, by a translator, which can configure the brick, the brick becomes a sub-volume. A brick (sub-volume) can be described using a server identifier with an export directory identifier. One or more bricks (sub-volumes) can be added to a volume to increase the distribution of data amongst volumes and/or sub-volumes and to add to the capacity of the volume.

In one embodiment, data is striped across the storage servers 143A-C. For example, when a file is to be stored on the distributed file system 101, different portions of the file may be stored on each of the sub-volumes within a volume (where each sub-volume corresponds to a directory managed by a storage server 143A-C). In some instances, striping the data across the storage servers 143A-C improves performance for read and/or write operations. Additionally, striping the data across the storage servers 143A-C may create a single volume that is equal to the combined sizes of all of its sub-volumes. This may enable, for example, a single file that is larger than any individual sub-volume to be stored on the striped volume.

Any number of client machines 102 can include a file system client 136 to communicate with the storage servers 143A-C in the file system 101. The client machine 102 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The file system client 136 can mount the file system 101 via a mount point to access the data associated with a particular tenant in the file system 101. For example, the file system client 136 may be configured to mount the file system 101 using a volume identifier (e.g., volume label) and a file path that is stored in configuration data.

The file system client 136 may include a file striping module 138 that stripes data across the storage servers 143A-C during file write operations, and that reads the data from the multiple storage servers 143A-C and recreates the data for file read operations. Once a file system client writes an initial file to the distributed file system in a striped configuration, any other file system client may read the file from the distributed file system using the file striping module 138. The file striping module 138 may determine how many portions to break a file into, as well as which storage servers 143A-C on which to store each of the portions. Additionally, the file striping module 138 may modify offsets of the portions that will be stored in file entries by the storage servers 143A-C. The offsets of the portions may be modified to cause the portions to have contiguous offsets within the file entries. Such modifications are referred to herein as performing coalesced striping of a file. For example, a second portion of the file may by assigned to storage server 143B and may initially have offsets of 128 kb-255 kb, but may be modified to have an offset of 0 kb-127 kb. Similarly, a fifth portion of the file may be assigned to the storage server 143B and may initially have an offset of 512 kb, but may be modified to have an offset of 128 kb-255 kb. Implementations of the file striping module 138 are described in greater detail below in conjunction with FIG. 2.

The client machines 102 can host one or more applications 134. An application 134 can be any type of application including, for example, a web application, a desktop application, a browser application, etc. An application 134 may request access (e.g., read, write, etc.) to the data in the file system 101 via the mount point and the file system client 136.

Figure 2:
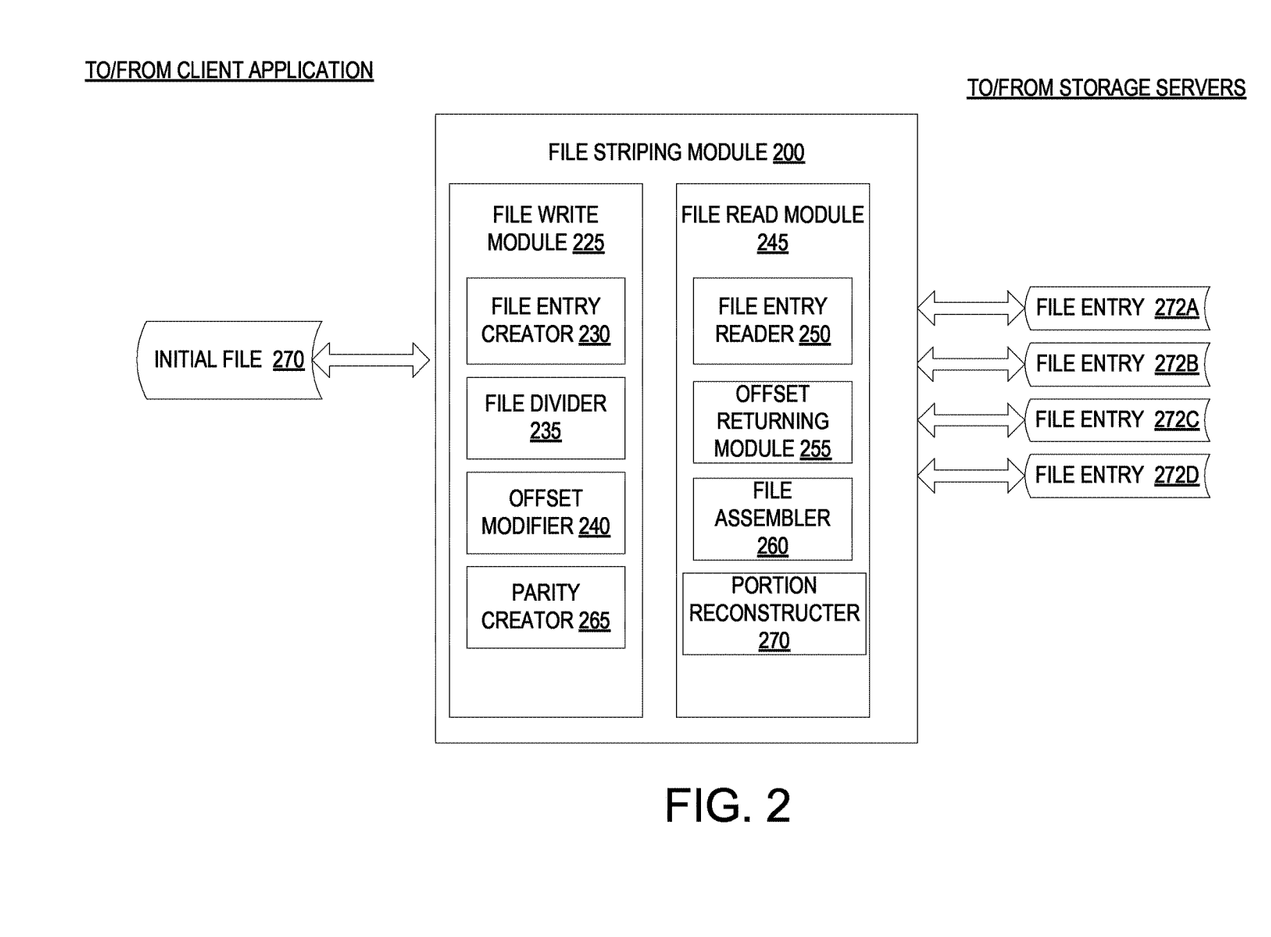
FIG. 2 is a block diagram of an implementation of a file striping module.

FIG. 2 illustrates a block diagram of one implementation of a file striping module 200. In one embodiment, file striping module 200 corresponds to file striping module 138 of FIG. 1. File striping module 200 may include a file write module 225 and a file read module 245. In some embodiments, the functionality of one or more of the file write module 225 and file read module 245 may be combined into a single module or subdivided into multiple modules.

File striping module 200 may be implemented as a translator that connects to one or more sub-volumes (e.g., to one or more storage servers). File striping module 200 translates between initial whole files that may be presented to clients and file entries (including portions of the initis1 file) that may be stored in sub-volumes of the storage servers. File striping module 200 may be connected to one or more additional translators, which may operate on initial whole files before they are input into file striping module 200 and after they are output by file striping module 200. Alternatively, or additionally, file striping module 200 may be connected to one or more additional translators that operate on file entries (which contain portions of the initial files) after they are output by file striping module 200 or before they are input into file striping module 200. Examples of other translators include a security translator that may encrypt data, a replication translator that generates copies of data, a locking translator that manages locks for data, and so on.

File write module 225 may operate on an initial file 270 responsive to a write command. As used herein, the term "initial" means a file before it has been separated into portions and/or file entries. The term initial should not be interpreted to refer to a version number of the file. For example, an initial file 270 may be a fifth version of a file before that fifth version has been broken up for distribution to multiple different file entries.

A volume of a distributed file system may include multiple sub-volumes, where each sub-volume is associated with a different storage server. File write module 225 may take an initial file 270 as input, and stripe that initial file 270 across the different sub-volumes. To perform the striping, file write module 225 may include a file entry creator 230, a file divider 235 and an offset modifier 240.

File entry creator 230 creates a separate file entry 272A-D of the initial file 270 for each of the sub-volumes. The file entries 272A-D may have a name that matches or is derived from a name of the initial file 270. To create the file entries 272A-D, file entry creator 225 may issue commands to distributed file system services running on the storage servers managing the sub-volumes. In response to the command, each of the distributed file system services may interface with an underlying local file system to cause that local file system to create a file entry.

File divider 235 divides the initial file 270 into multiple portions (colloquially known as chunks). Each of the portions may have the same size, which may be controlled by file divider 235. One common portion size is 128 kilobytes (kb). However, other larger or smaller portion sizes may also be used, such as 56 kb, 256 kb, 512 kb, and so on. Once file divider 245 has determined the portions into which the initial file 270 will be divided, file divider 235 assigns each of those portions to one of the available sub-volumes (and thus to the individual file entries on those sub-volumes). In one embodiment, the portions are assigned to the sub-volumes using a round-robin allocation technique. For example, a first portion may be allocated to a first sub-volume, a second portion may be allocated to a second sub-volume, a third portion may be allocated to a third sub-volume, a fourth portion may be allocated to the first sub-volume, a fifth portion may be allocated to the second sub-volume, and so on. Allocation of the portions to the sub-volumes may continue until all portions have been allocated. In alternative embodiments, other allocation techniques may be used to determine which portions to allocate to which file entries 272A-D. In either case, portions may be approximately evenly distributed across the sub-volumes that make up a volume.

Each of the initial file's portions may have initial offsets within the initial file 270. For example, if a 128 kb portion size is used, then a first portion may have an initial offset of 0, a second portion may have an initial offset of 128 kb, a third portion may have an initial offset of 256 kb, and so on. Offset modifier 240 may modify the offsets of the portions so that they will have offsets within the file entries 272A-C that are different from their offsets within the initial file 270. By modifying the offsets, offset modifier 240 causes the portions to coalesce, so that the portions within the file entries will be contiguous. That way there are no holes or gaps (unwritten ranges) within the file entries. This can improve read and write performance of the file entries by maintaining a file layout for which traditional local disk file systems are optimized. In one embodiment, offset modified 220 adds a flag to the file entries that identifies those file entries as having been coalesced. This may ensure that a file system client reading the file entries from the storage servers will know to return the portions' offsets to their initial states before recombining them into the initial file.

Figure 3:
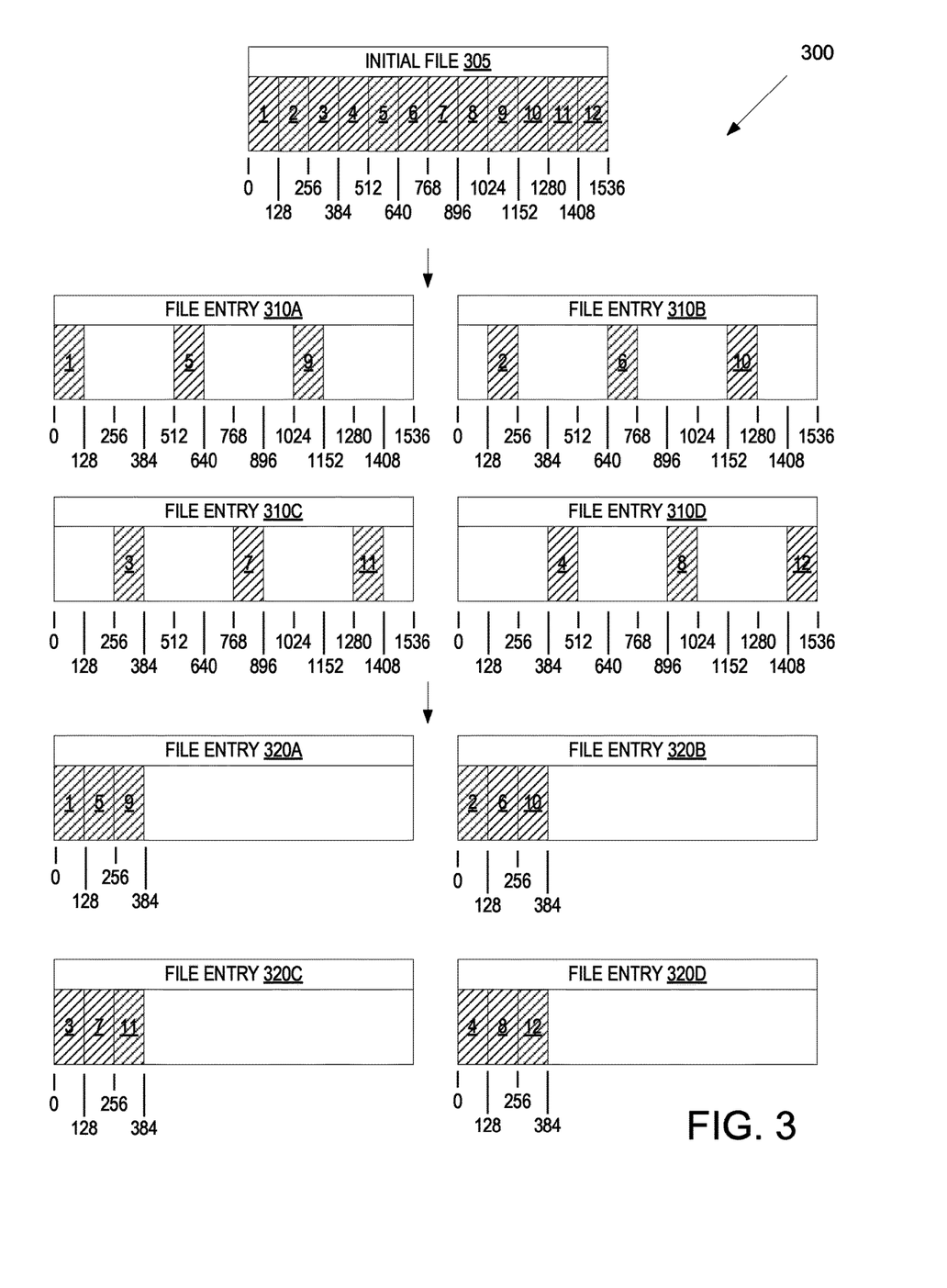
FIG. 3 is a block diagram illustrating a file before and after being striped across multiple storage servers.

FIG. 3 is a block diagram illustrating an example file before and after being striped across multiple storage servers. As shown, an example initial file 305 of FIG. 3 is divided into twelve portions 1-12, each of which has a 128 kb portion size. Portion 1 has an initial offset of 0 within the initial file, portion 2 has an initial offset of 128 kb, portion 3 has an initial offset of 256 kb, and so on. Accordingly, the initial file has a size of 1536 kb.

As shown, four file entries 310A-D are generated from the initial file 305, and three of the portions are assigned to each of the file entries 310A-D. For example, portions 1, 5 and 9 are assigned to file entry 310A, portions 2, 6 and 10 are assigned to file entry 310B, portions 3, 7 and 11 are assigned to file entry 310C and portions 4, 8 and 12 are assigned to file entry 310D. Without the offsets of the portions 1-12 being modified, file entry 310A has a file size of approximately 1152 kb, file entry 310B has a file size of approximately 1280 kb, file entry 310C has a file size of approximately 1408 kb, and file entry 310D has a file size of approximately 1536.

To improve performance, the offsets of the portions within the file entries are modified, as shown in file entries 320A-D. In practice, the offsets may be modified prior to the portions being written to the file entries. Accordingly, the portions may be written at the modified offsets within the file entries 320A-D. A shown, portions 1, 5 and 9 are contiguous within file entry 320A, with portion 5 beginning at offset 128 where portion 1 ends and portion 9 beginning at offset 256 where portion 5 ends. Accordingly, file entry 320A has a file size of approximately 384 kb. The offsets of the portions in file entries 320B-D are similarly modified, so that the portions are contiguous in these file entries as well. Accordingly, file entries 320B-D also have file sizes of approximately 384 kb. As a result, the combined size of the file entries 320A-D is approximately equal to the file size of the initial file 305.

Returning to FIG. 2, after the portions are assigned to the file entries 272A-C on the different sub-volumes and the offsets are modified, file write module 225 may write the portions at the modified offsets in the file entries 272A-D. Since the portions of the initial file that are included in the file entries 272A-D are contiguously arranged, storage space that is preallocated by local file systems for storage of the file entries may be used. This may reduce or eliminate unused space in the file entries 272A-D.

File read module 245 receives as an input a request to read an initial file that has been striped across multiple storage servers of the distributed file system. File read module 245 may include a file entry reader 250, an offset returning module 255 and a file assembler 260. file entry reader 250 may use a file identifier included in the read request to identify and locate the file entries 272A-D into which the initial file 270 was split for storage. file entry reader 250 may fetch each of the file entries 272A-D from storage on the various different storage servers.

As discussed above, the offsets of the portions within the file entries may not correspond to initial offsets of those portions within the initial file 270. Accordingly, offset returning module 255 may return the offsets of the portions to their original offsets within the initial file 270. Offset returning module 255 may have information identifying a number of storage servers (e.g., nodes) included in a volume. Offset returning module 255 may also have information identifying a portion size for the portions in the file entries 272A-D. For each portion in the file entries 272A-D, offset returning module 255 may convert a current offset into an original offset based on the value of the current offset, the number of storage servers, the storage server that stored the portion, and the portion size. For example, offset returning module 255 may identify that there are four storage servers and that a portion size of 128 kb has been used. Accordingly, offset returning module 255 may determine that data at offsets 0-128 kb in a first file entry 272A corresponds to portion 1, that the data at offsets 128-256 kb corresponds to portion 5, that data at offsets 256 kb to 384 kb corresponds to portion 9, and so on. Offset returning module 255 may then determine that the offset for portion 1 should remain unchanged, that the offset for portion 2 should be modified to begin at offset 512 kb, that the data at portion 9 should be modified to begin at offset 1024, and so on.

File assembler 260 adds the portions to a reconstructed initial file 270 at the computed offsets (which correspond to the initial offsets of those portions before they were modified and written to the file entries 272A-D). Once file assembler 260 has reconstructed the initial file 270 (or a section of the initial file in some embodiments), file read module 245 provides the initial file 270 to a requester In some embodiments, parity information may be generated and used to provide a fail safe in case a storage server should stop functioning or otherwise lose its data. Accordingly, file write module 225 may include a parity creator 265 and file read module 245 may include a portion reconstructer 270 that enable the generation and use of parity information.

Parity creator 265 creates parity portions based on the data portions that the initial file is divided into. There are two options that may be used if parity information is generated. According to a first option, one of the storage servers may be dedicated to the storage of parity data. The data portions of the initial file may be divided between one fewer than a total number of storage servers in the distributed file system. The remaining server that does not receive data portions will receive generated parity portions. For example, if there are four different storage servers acting as nodes for a volume, then data portions of the initial file may be divided into three different subsets. Parity creator 265 may perform an exclusive or (XOR) operation using a first portion from each of the subsets. For example, an XOR operation may be performed between portions 1, 2 and 3 if there are three subsets. This may result in a first parity portion, which parity creator 265 may add to a parity file that is stored in the fourth storage server that is dedicated to the storage of parity information. Similarly, an XOR operation may be performed between portions 4, 5 and 6 to produce a second parity portion, and so on. A resulting parity file will accordingly have a file size that is approximately equal to the file sizes of the file entries.

According to a second option, each of the storage servers store both data portions and parity portions. Accordingly, the parity portions are distributed across all of the storage servers that make up a volume. For each stripe (e.g., every three concurrent portions in a distributed file system having four storage servers), a parity portion is created. Which storage server to store that parity portion on may be determined in a round robin fashion. For example, a first parity portion (generated from data portions 1-3) may be stored on a fourth storage server, a second parity portion (generated from data portions 4-6) may be stored on a third storage server, a third parity portion (generated from data portions 7-9) may be stored on a second storage server, and a fourth parity portion (generated from data portions 10-12) may be stored on a first storage server. A fifth parity portion may then be stored on the fourth storage server, a sixth parity portion may be stored on the third storage server, and so on.

Use of the parity portions increases an amount of storage space that is utilized to store data. However, the total increase in storage space is relatively small (equal to $X/(S-1)$, where X is the file size of the initial file and S is the number of storage servers). In some implementations, the initial file is modified by adding the parity portions to the initial file. The parity portions may then also be added to file entries or to a parity file. Alternatively, the parity portions may be added to the file entries without also being added to the initial file. In such implementations, a file striping module 200 would know not to include the parity portions in a reconstructed initial file. In yet another implementation, the parity portions may be added to a separate parity file without also being added to the initial file or to the file entries.

Portion reconstructer 270 determines whether any data portions are to be reconstructed, and reconstructs those data portions if they are to be reconstructed. Regardless of how the parity portions are distributed among the data stores, the mechanism used by portion reconstructer 270 to recover data may be unchanged. Portion reconstructer 270 determines whether any data portions in a particular stripe are invalid or missing. If the data portions within a stripe are all present and valid, portion reconstructer 270 may perform no further actions for that stripe. If a data portion is invalid or missing, then portion reconstructer 270 reconstructs the invalid or missing data portion by performing an XOR operation using the remaining data portions in the stripe and the parity portion generated from those data portions. Portion reconstructer 270 may then provide the reconstructed data portion to file assembler 260 and/or to offset returning module 255.

Figure 4:
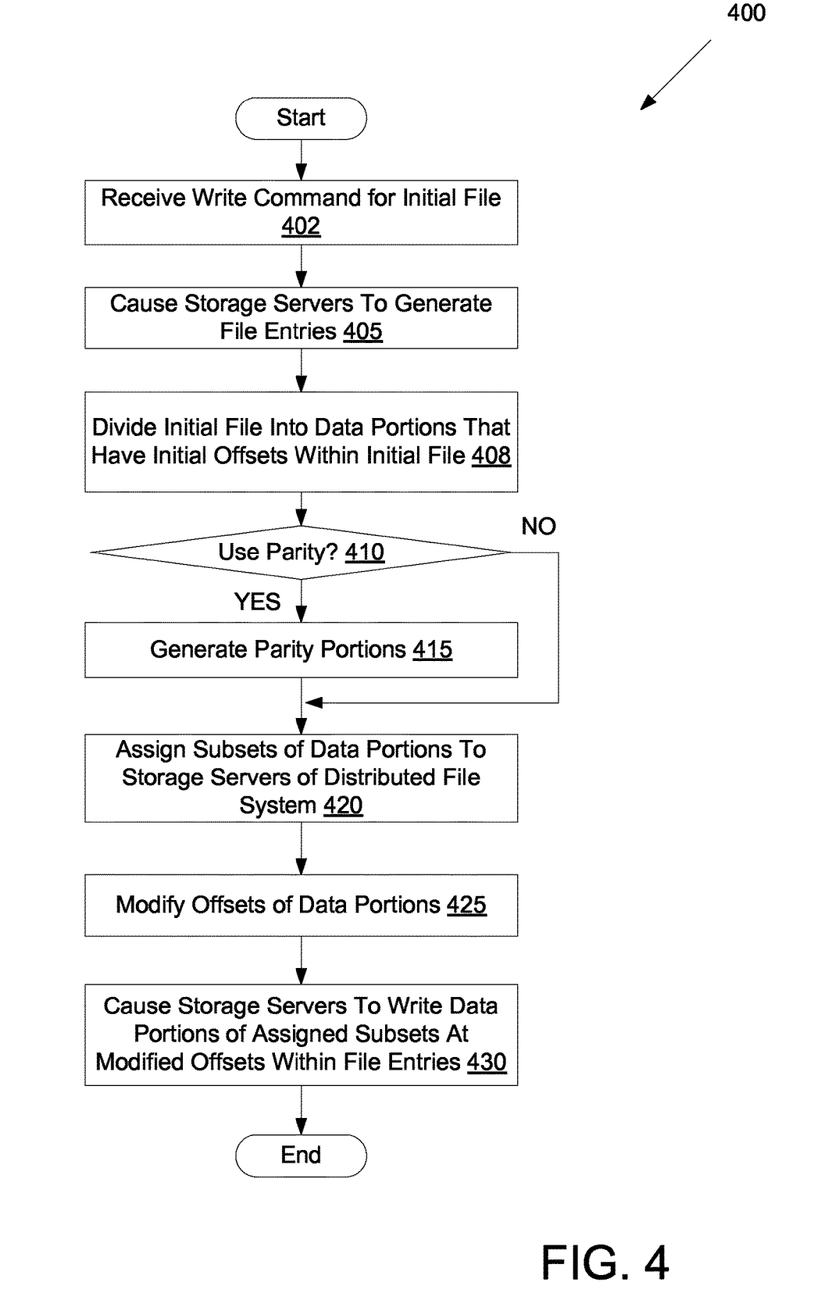
FIG. 4 is a flow diagram illustrating an implementation for striping a file across storage servers of a distributed file system to satisfy a write command.
Figure 5:
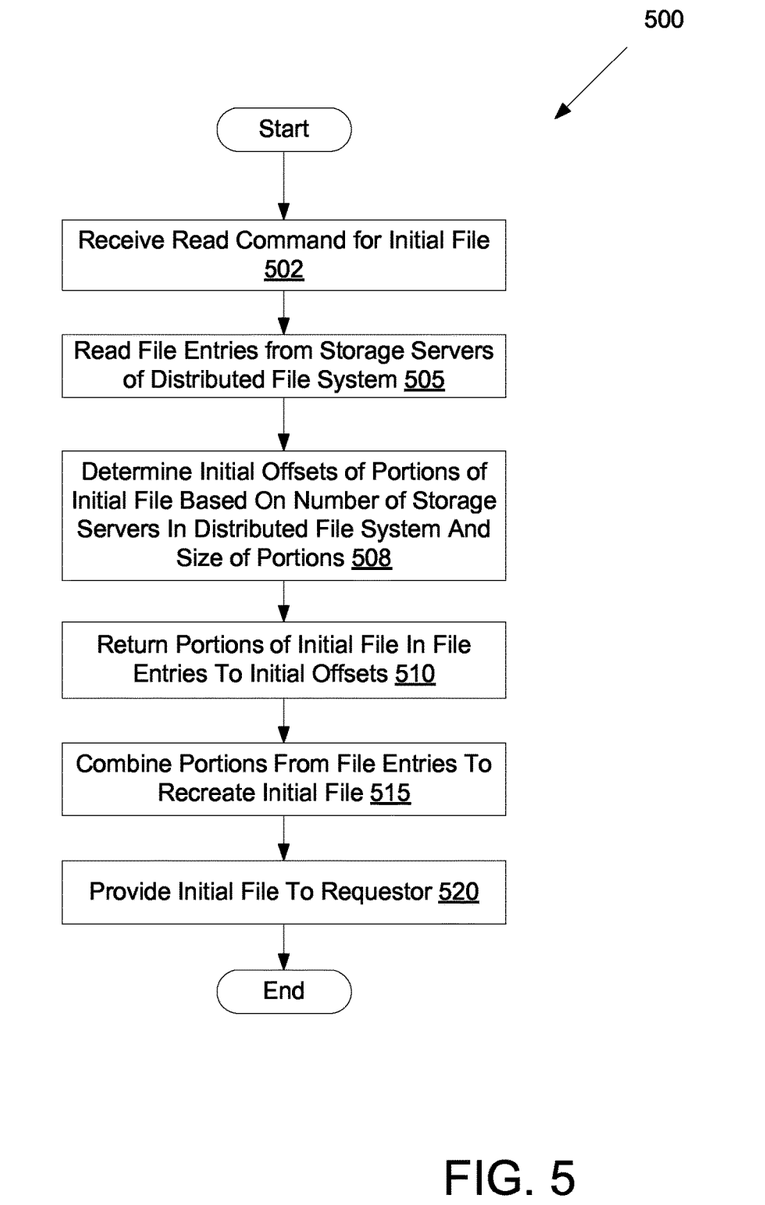
FIG. 5 is a flow diagram illustrating an implementation for a method of satisfying a read command on a file that has been striped across multiple storage servers in a distributed file system.

FIGS. 4-5 are flow diagrams showing various methods for striping data across storage servers in a distributed file system. The methods may be performed by a computing device that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a file striping module 200 of FIG. 2.

FIG. 4 is a flow diagram illustrating one embodiment for a method 400 of striping a file across storage servers or other nodes of a distributed file system to satisfy a write command. At block 402 of method 400, processing logic receives a write command for an initial file. At block 405, processing logic causes storage servers (or other nodes) of the distributed file system to create file entries of the initial file.

At block 408, processing logic divides the initial file into data portions that have initial offsets within the initial file. At block 410, processing logic determines whether parity portions are to be used. If parity portions are to be used, the method proceeds to block 415 and processing logic generates the parity portions. The parity portions may be computed by dividing the data portions into stripes. Each stripe may be a concurrent sequence of data portions, wherein the sequence includes one fewer data portion than there are storage servers or nodes in the distributed file system. XOR operations may then be performed using the data portions in the stripes. Therefore, a different parity portion may be created for each stripe. In one embodiment, the parity portions are added to the initial file (e.g., at an end of the initial file). If at block 410 no parity portions are to be used, the method proceeds to block 420.

At block 420, processing logic assigns subsets of the data portions to the storage servers in the distributed file system. Processing logic may also assign subsets of the parity portions to the storage servers if parity portions were generated. At block 425, processing logic modifies offsets of the data portions. At block 430, processing logic may then cause the storage servers to write the data portions of the assigned subsets at their modified offsets within the file entries. This may cause the data portions to be arranged contiguously within the file entries, so that the file entries do not include any holes (empty regions). The parity portions may also be written to the file entries or to a separate parity file that may be stored at a storage server that is dedicated to the storage of parity information.

FIG. 5 is a flow diagram illustrating an implementation for a method 500 of satisfying a read command on a file that has been striped across multiple storage servers in a distributed file system. At block 502 of method 500, processing logic receives a read command for an initial file that has been stored in a distributed file system. The initial file may have been striped across multiple storage servers or nodes in the distributed file system. Accordingly, various portions of the initial file may be stored by each of the different storage servers or nodes.

At block 505, processing logic reads file entries of the initial file from the storage servers of the distributed file system. At block 508, processing logic determines initial offsets of the portions of the initial file based on a number of storage servers in the distributed file system and a size of the portions. Other information that the processing device may use to calculate the initial offset for a data portion includes the modified offset of the data portion, and information on whether or not parity portions have been generated for the initial file.

At block 510, processing logic returns portions of the initial file in the file entries to their initial offsets (the offsets that they had before they were stored in the file entries). At block 515, processing logic combines the portions from the file entries to recreate the initial file. At block 520, processing logic then provides the initial file to a requester.

If parity portions have been generated and stored, then reading the initial file may include one or more additional operations. For example, before determining initial offsets of the portions, processing logic may determine whether any portions include invalid data or are missing. If such portions are invalid or missing, then processing logic may recreate the missing or invalid portion by performing an XOR operation between the parity portion and associated portions (other than the missing or invalid portion) that were used to create the parity portion.

Figure 6:
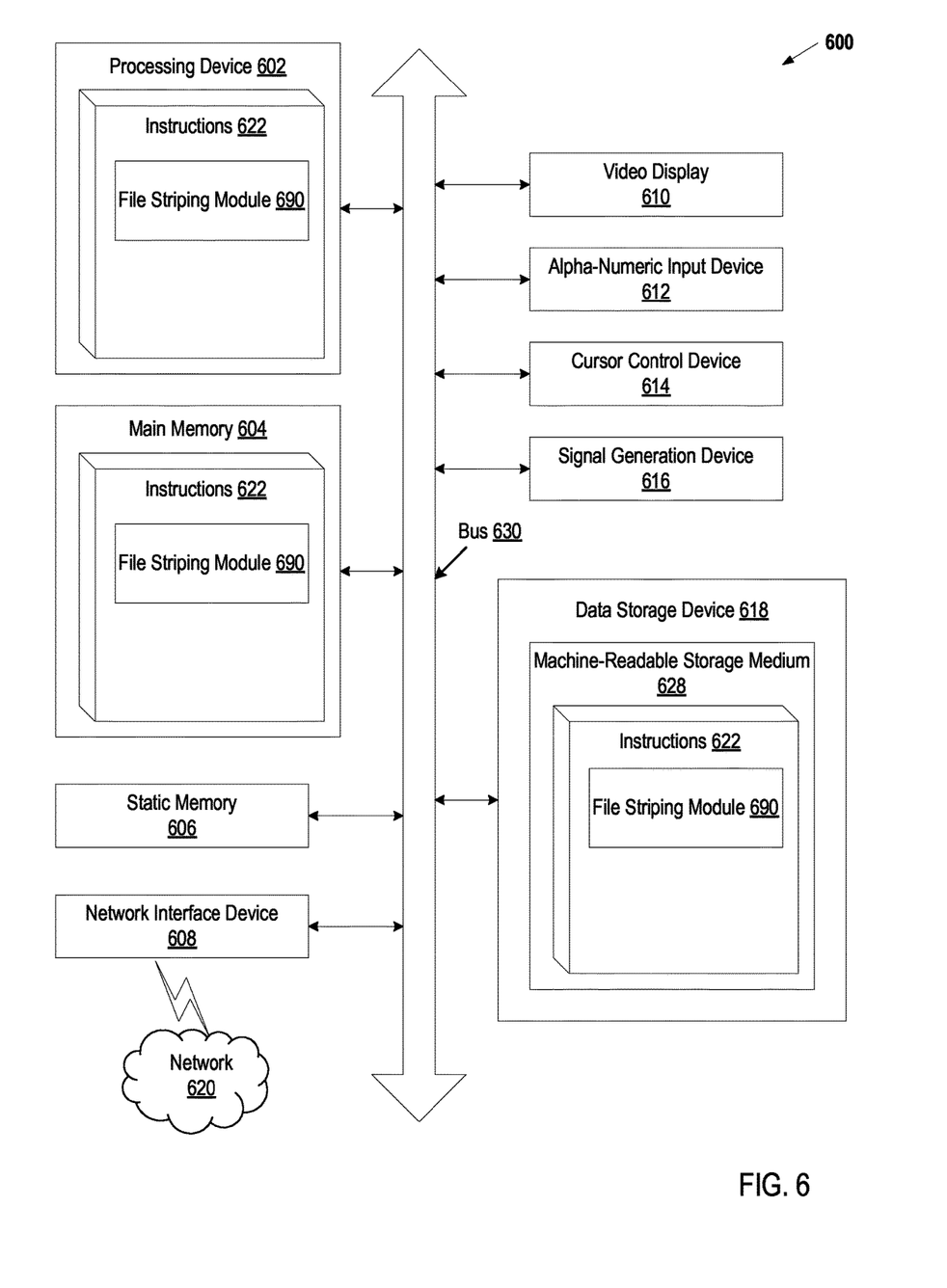
FIG. 6 is a block diagram of an example computer system that may perform one or more of the operations described herein.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a file striping module 690 (which may correspond, for example, to file striping module 200 of FIG. 2) and/or a software library containing methods that call a file striping module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "causing" or "mapping" or "assigning" or "dividing" or "making" or "reducing" or "combining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving an initial file by a file system client executed by a processing device of a client machine operatively coupled to a distributed file system, wherein the distributed file system comprises a volume including a plurality of nodes, each of the plurality of nodes comprising a local file system that interfaces with the distributed file system, and the volume is mounted by the file system client via a mount point using a volume identifier and a file path;
causing, by the file system client, the plurality of nodes to generate a plurality of file entries;
dividing the initial file into a plurality of portions, each of the plurality of portions having initial offsets within the initial file;
assigning subsets of the plurality of portions to the plurality of file entries, wherein each of the plurality of file entries is assigned a different subset;
prior to the plurality of nodes writing the subsets of the plurality of portions to the plurality of file entries, modifying, by the file system client, the initial offsets of the subsets into modified offsets that are different than the initial offsets, wherein the modified offsets cause the portions of the assigned subsets to be contiguous within their respective file entries;
causing, by the file system client, the plurality of nodes to coalesce the subsets assigned to the plurality of file entries by writing the portions of the assigned subsets at the modified offsets within the plurality of file entries;
causing the plurality of nodes to write flags to the file entries, wherein each of the flags identifies a file entry as being a coalesced file entry containing a coalesced subset of the plurality of portions of the initial file;

receiving, at the file system client, a request to access the initial file via the mount point from an application executing by the processing device on the client machine;

reading, at the file system client via the mount point, the plurality of file entries comprising the flags from the plurality of nodes to obtain the plurality of portions; and causing, by the file system client in view of reading the flags, the modified offsets to be returned to the initial offsets prior to recombining the plurality of portions into the initial file to provide to the application of the client machine.

2. The method of claim 1, further comprising:

determining, by the file system client in view of the flags, that the plurality of file entries are coalesced file entries;

responsive to determining that the plurality of file entries are coalesced file entries, returning, by the file system client, the plurality of portions from the modified offsets to the initial offsets;

recombining, by the file system client, the plurality of portions to recreate the initial file; and providing, by the file system client, the initial file to the application.

3. The method of claim 2, wherein returning the plurality of portions from the modified offsets to the initial offsets comprises:

determining the initial offsets from the modified offsets in view of a quantity of the plurality of nodes and a portion size of the plurality of portions.

4. The method of claim 1, wherein the plurality of portions are assigned to the plurality of nodes using a round robin allocation technique.

5. The method of claim 1, wherein a first size of the plurality of file entries is approximately equal to a second size of the initial file divided by a quantity of the nodes.

6. The method of claim 1, further comprising:

generating parity portions for the initial file in view of performing exclusive or (XOR) operations using the plurality of portions.

7. The method of claim 6, further comprising:

adding subsets of the parity portions to the plurality of file entries.

8. The method of claim 6, further comprising:

creating a parity file from the parity portions; and causing an additional node to store the parity file.

9. A non-transitory computer readable storage medium having instructions that, when executed by a processing device, cause the processing device to:

receive an initial file by a file system client executed by a processing device of a client machine operatively coupled to a distributed file system, wherein the distributed file system comprises a volume including a plurality of nodes, each of the plurality of nodes comprising a local file system that interfaces with the distributed file system, and the volume is mounted by the client machine via a mount point using a volume identifier and a file path;

cause, by the file system client, the plurality of nodes to generate a plurality of file entries;

divide the initial file into a plurality of portions, each of the plurality of portions having initial offsets within the initial file;

assign subsets of the plurality of portions to the plurality of file entries, wherein each of the plurality of file entries is assigned a different subset;

prior to the plurality of nodes writing the subsets of the plurality of portions to the plurality of file entries, modifying, by the file system client, the initial offsets of the subsets into modified offsets that are different than the initial offsets, wherein the modified offsets cause the portions of the assigned subsets to be contiguous within their respective file entries;

cause, by the file system client, the plurality of nodes to coalesce the subsets assigned to the plurality of file entries by writing the portions of the assigned subsets at the modified offsets within the plurality of file entries;

cause the plurality of nodes to write flags to the file entries, wherein each of the flags identifies a file entry as being a coalesced file entry containing a coalesced subset of the plurality of portions of the initial file;

receive, at the file system client, a request to access the initial file via the mount point from an application executing by the processing device on the client machine; and read, at the file system client via the mount point, the plurality of file entries comprising the flags from the plurality of nodes to obtain the plurality of portions; and causing, by the file system client in view of reading the flags, the modified offsets to be returned to the initial offsets prior to recombining the plurality of portions into the initial file to provide to the application of the client machine.

10. The non-transitory computer readable storage medium of claim 9, the instructions to further cause the processing device to:

determine, by the file system client in view of the flags, that the plurality of file entries are coalesced file entries;

responsive to determining that the plurality of file entries are coalesced file entries, return, by the file system client, the plurality of portions from the modified offsets to the initial offsets;

combine, by the file system client, the plurality of portions to recreate the initial file; and provide, by the file system client, the initial file to the application.

11. The non-transitory computer readable storage medium of claim 10, wherein returning the plurality of portions from the modified offsets to the initial offsets comprises:

determining the initial offsets from the modified offsets in view of a quantity of the plurality of nodes and a portion size of the plurality of portions.

12. The non-transitory computer readable storage medium of claim 9, wherein the plurality of portions are assigned to the plurality of nodes using a round robin allocation technique.

13. The non-transitory computer readable storage medium of claim 9, wherein a first size of the plurality of file entries is approximately equal to a second size of the initial file divided by a quantity of the nodes.

14. The non-transitory computer readable storage medium of claim 9, the instructions to further cause the processing device to:

generate parity portions for the initial file in view of performing exclusive or (XOR) operations using the plurality of portions.

15. The non-transitory computer readable storage medium of claim 14, wherein the instructions further cause the processing device to:

add subsets of the parity portions to the plurality of file entries.

16. The non-transitory computer readable storage medium of claim 14, wherein the instructions further cause the processing device to:
create a parity file from the parity portions; and
cause an additional node to store the parity file.

17. A computing device comprising:
a memory to store instructions for a file system client of a distributed file system, wherein the distributed file system comprises a volume including a plurality of nodes, each of the plurality of nodes comprising a local file system that interfaces with the distributed file system, and the volume is mounted by the client machine via a mount point using a volume identifier and a file path; and
a processing device, operatively coupled to the memory, to execute the instructions for the file system client, the file system client to:
receive an initial file;
cause the plurality of nodes to generate a plurality of file entries;
divide the initial file into a plurality of portions, each of the plurality of portions having initial offsets within the initial file;
assign subsets of the plurality of portions to the plurality of file entries, wherein each of the plurality of file entries is assigned a different subset;
prior to the plurality of nodes writing the subsets of the plurality of portions to the plurality of file entries, modifying, by the file system client, the initial offsets of the subsets into modified offsets that are different than the initial offsets, wherein the modified offsets cause the portions of the assigned subsets to be contiguous within their respective file entries;
cause the plurality of nodes to coalesce the subsets assigned to the plurality of file entries by writing the portions of the assigned subsets at modified offsets within the plurality of file entries;
cause the plurality of nodes to write flags to the file entries, wherein each of the flags identifies a file entry as being a coalesced file entry containing a coalesced subset of the plurality of portions of the initial file;
receive, at the file system client, a request to access the initial file via the mount point from an application executing by the processing device of the computing device;
read, at the file system client via the mount point, the plurality of file entries comprising the flags from the plurality of nodes to obtain the plurality of portions; and
causing, by the file system client in view of reading the flags, the modified offsets to be returned to the initial offsets prior to recombining the plurality of portions into the initial file to provide to the application.

18. The computing device of claim 17, wherein the processing device is further to:
determine, by the file system client in view of the flags, that the plurality of file entries are coalesced file entries;
responsive to determining that the plurality of file entries are coalesced file entries, return, by the file system client, the plurality of portions from the modified offsets to the initial offsets;
combine, by the file system client, the plurality of portions to recreate the initial file; and
provide, by the file system client, the initial file to the application.

19. The computing device of claim 18, wherein returning the plurality of portions from the modified offsets to the initial offsets comprises:
determining the initial offsets from the modified offsets in view of a quantity of the plurality of nodes and a portion size of the plurality of portions.

20. The computing device of claim 18, the processing device further to:
generate parity portions for the initial file in view of performing exclusive or (XOR) operations using the plurality of portions.

* * * * *